US012582102B1

(12) United States Patent
Payne

(10) Patent No.: US 12,582,102 B1
(45) Date of Patent: Mar. 24, 2026

(54) WINDOW SYSTEM, APPARATUS, AND METHOD FOR A FLUID CONTAINER

(71) Applicant: Effluent LLC, Hudgins, VA (US)

(72) Inventor: Brenton Edward Payne, Hudgins, VA (US)

(73) Assignee: Effluent LLC, Hudgins, VA (US)

( * ) Notice: Subject to any disclaimer, the term of this patent is extended or adjusted under 35 U.S.C. 154(b) by 0 days.

(21) Appl. No.: 19/092,816

(22) Filed: Mar. 27, 2025

(51) Int. Cl.
*A01K 63/00* (2017.01)

(52) U.S. Cl.
CPC .................................... *A01K 63/00* (2013.01)

(58) Field of Classification Search
CPC ........ A01K 63/00; A01K 63/003; E04H 4/14; E06B 5/00; E06B 1/02; E06B 1/04; E04G 15/02
USPC .......................... 119/215; 52/171.1, 208, 215
See application file for complete search history.

(56) References Cited

U.S. PATENT DOCUMENTS

| | | | | |
|---|---|---|---|---|
| 534,052 A * | 2/1895 | Ruhe | .................... A01K 63/003 | |
| | | | | 52/250 |
| 2,567,353 A * | 9/1951 | Ryan | ................. B32B 17/10761 | |
| | | | | 52/208 |
| 4,353,327 A * | 10/1982 | Shroyer | ............... A01K 63/003 | |
| | | | | 40/725 |
| 4,856,575 A * | 8/1989 | Wells | .................... A01K 1/035 | |
| | | | | 29/445 |
| 5,197,409 A * | 3/1993 | Hammond | ............ A47F 5/0025 | |
| | | | | 119/245 |

| | | | | |
|---|---|---|---|---|
| 6,581,668 B1 * | 6/2003 | Oakley | ..................... E06B 9/52 | |
| | | | | 160/180 |
| 8,544,225 B2 * | 10/2013 | Lakoduk | .................. H02G 3/12 | |
| | | | | 52/220.1 |
| 10,975,587 B2 * | 4/2021 | Nelson | ...................... E04H 4/14 | |
| 2005/0166858 A1 * | 8/2005 | Lari | ..................... A01K 63/003 | |
| | | | | 119/269 |
| 2006/0130773 A1 * | 6/2006 | Shawver | .............. A01K 63/003 | |
| | | | | 119/257 |
| 2007/0107664 A1 * | 5/2007 | Wittstock | ............... A01K 63/00 | |
| | | | | 119/246 |
| 2013/0180042 A1 * | 7/2013 | Guridi | ....................... E04H 4/00 | |
| | | | | 4/506 |
| 2019/0145157 A1 * | 5/2019 | Diaz Ferrer | .............. E06B 1/00 | |
| | | | | 52/167.1 |

FOREIGN PATENT DOCUMENTS

GB 2528636 2/2016

\* cited by examiner

*Primary Examiner* — Timothy D Collins
*Assistant Examiner* — Maria E Graber
(74) *Attorney, Agent, or Firm* — Keefe IP Law, PLLC

(57) ABSTRACT

An apparatus for supporting a window in a fluid container formed by a plurality of wall blocks attached by curable material is disclosed. The apparatus has a frame member including a container flange configured to abut against at least some of the plurality of wall blocks, a plurality of posts disposed at the container flange and configured to be received in the curable material disposed between the plurality of wall blocks, a retainer member, and a plurality of fasteners. The retainer member is configured to be attached to the frame member based on the plurality of fasteners being received through a plurality of apertures of the container flange and a plurality of apertures of the retainer member and by being received in the plurality of posts.

20 Claims, 13 Drawing Sheets

Free Body Diagram, Side View
Fully Assembled Frame Assembly 300

- $F_s$, Hydrostatic Pressure Prism, Varies with depth, zero when empty for maintenance or other reasons

- $F_{wb}$, Wall Block on Flange, Force from wall black on perimeter flange of frame assembly

- $F_f$, Curable Material 415 Friction, Force from wall block on perimeter flange of frame assembly

- $F_d$, Temporary Dynamic Forces, (e.g. person leaning on glass, wind)

- $F_{hd}$, Temporary Hydrodynamic Forces, (e.g. waves, movement of aquatic life)

- $F_a$, Anchoring Assembly 330 Friction and Anchoring Forces due to all anchoring assemblies (cumulative).

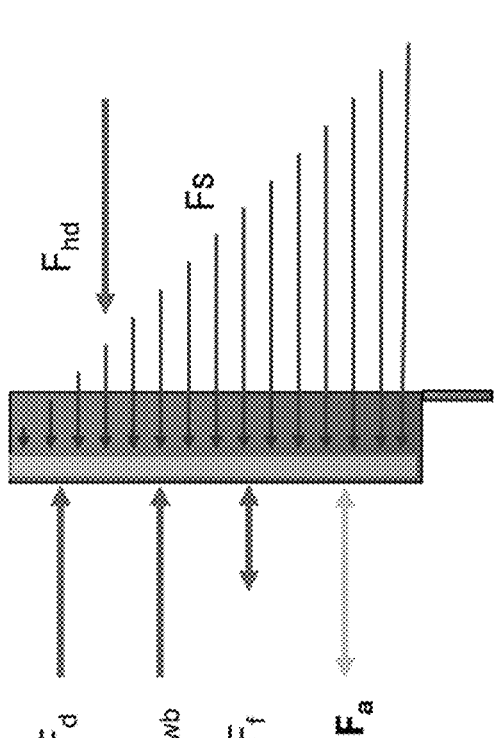

*Fig. 22A*

Normal
Pond Operation

Pond Empty

WINDOW SYSTEM, APPARATUS, AND METHOD FOR A FLUID CONTAINER

TECHNICAL FIELD

The present disclosure generally relates to a window system, apparatus, and method, and more particularly to a window system, apparatus, and method for a fluid container.

BACKGROUND

Landscaping for residential yards, commercial areas such as shopping areas and business areas, and other locations often include landscaping. Such landscaping can include hardscaping that may include water-retaining areas such as ponds. These ponds can be partially and/or substantially entirely manmade. As one example, above-ground fish ponds such as koi ponds can be included in hardscaping of such locations.

To enhance enjoyment by users, such ponds often include windows. For example, users can look through pond windows to see fish such as koi and other underwater features of the pond.

One disadvantage with including windows in ponds is that the windows can be a source of water leakage from the pond. Another disadvantage of such windows is that forces related to the use of the pond can move or dislodge windows. For example, lateral forces such as a user leaning on the windows, hydrostatic pressure forces from the retained water, and hydrodynamic forces due to fish and pond jets or bubblers can exert forces on the window that can lead to malfunction of the window.

Conventional frames for supporting windows in such ponds have been used to attempt to prevent leakage and movement of the windows due to lateral forces. However, these conventional frames are often ineffective for these purposes, with significant leakage through windows and movement of the frames and windows still occurring despite use of the conventional frames.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus for supporting a window in a fluid container formed by a plurality of wall blocks attached by curable material. The apparatus includes a frame member including a container flange configured to abut against at least some of the plurality of wall blocks, a plurality of posts disposed at the container flange and configured to be received in the curable material disposed between the plurality of wall blocks, a retainer member, and a plurality of fasteners. The retainer member is configured to be attached to the frame member based on the plurality of fasteners being received through a plurality of apertures of the container flange and a plurality of apertures of the retainer member and by being received in the plurality of posts.

In another aspect, the present disclosure is directed to a method for providing a fluid container. The method includes providing a plurality of wall blocks forming the fluid container, attaching the plurality of wall blocks using curable material, providing a frame member including a container flange having a plurality of posts attached at the container flange, disposing the container flange against at least some of the plurality of wall blocks, receiving the plurality of posts in the curable material disposed between the plurality of wall blocks, and fastening a retainer member to the container flange using a plurality of fasteners, the retainer member being attached to the frame member based on the plurality of fasteners being received through a plurality of apertures of the container flange and a plurality of apertures of the retainer member and by being received in the plurality of posts.

BRIEF DESCRIPTION OF THE DRAWINGS

FIGS. 22A, 22B, and 22C are schematic depictions of exemplary embodiments of the present invention.

DETAILED DESCRIPTION AND INDUSTRIAL APPLICABILITY

The exemplary disclosed system, apparatus, and method may provide a window for any suitable fluid container such as, for example, a pond, a pool, a lake, an aquarium, a water treatment facility, a training facility for water sports and/or maritime activities, and/or any other suitable structure or reservoir for holding a fluid (e.g., such as fresh water or salt water or any other desired type of fluid or liquid). The exemplary disclosed system, apparatus, and method may include a window assembly.

Figure 1:
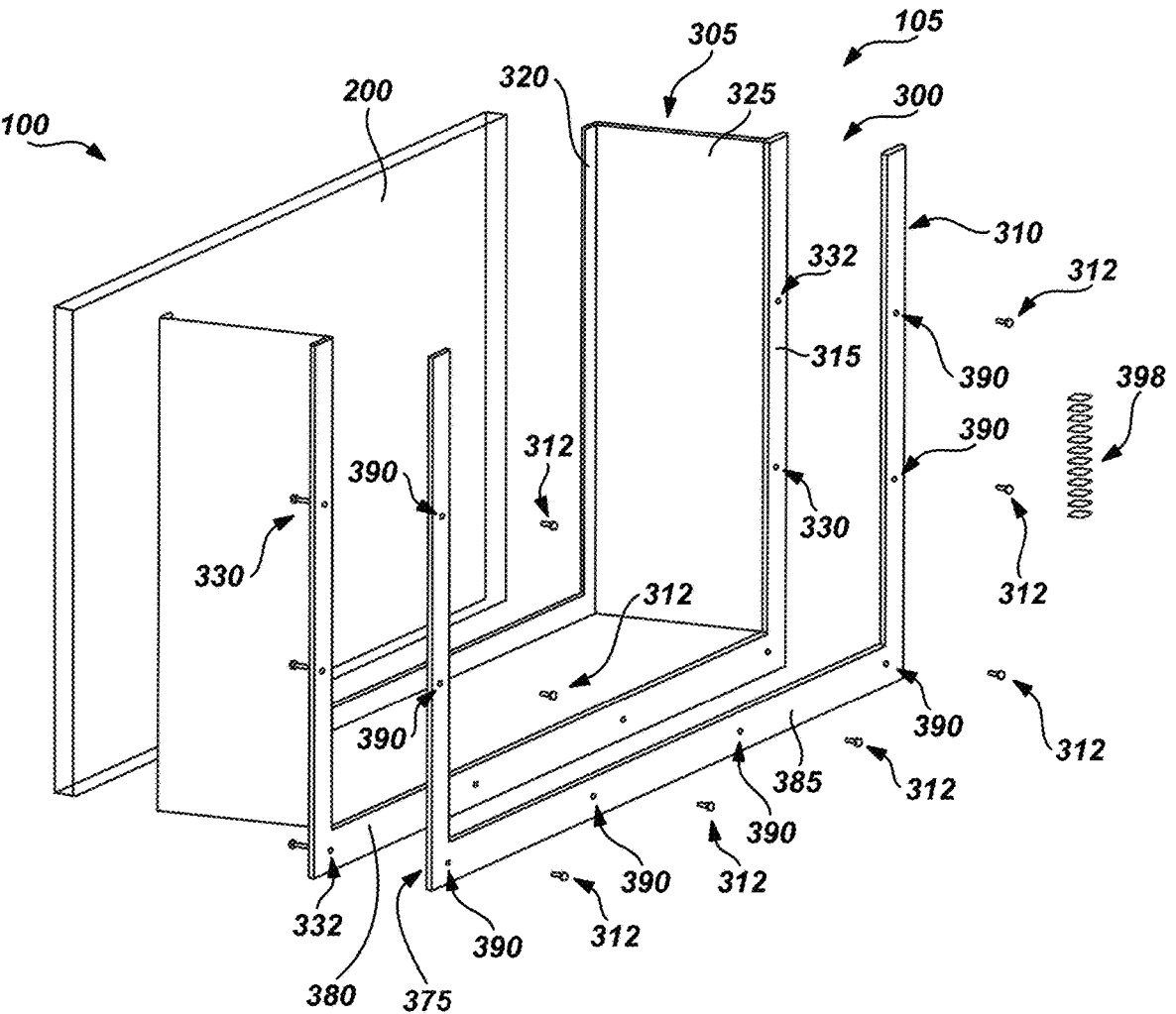
FIG. 1 is a perspective, exploded view of an exemplary embodiment of the present invention.

FIG. 1 illustrates an exemplary disclosed system 100 that may include an apparatus 105 that may be a window assembly. In at least some exemplary embodiments, apparatus 105 may be used to provide a window for the exemplary disclosed fluid container. Apparatus 105 may include a window 200 and a frame assembly 300. Frame assembly 300 may structurally support window 200.

Window 200 may be any suitable structural member for resisting forces (e.g., lateral forces) such as from a user, hydrostatic pressure forces from retained fluid, and/or hydrodynamic forces for example as described herein. Window 200 may be a transparent and/or translucent member. Window 200 may be a sheet-like member. Window 200 may be a glass member such as a layer (e.g., a pane or sheet) of tempered glass. For example, window 200 may be formed from tempered laminate glass. Window 200 may be formed from tempered glass, annealed glass, ceramic glass, heat-strengthened glass, or any other suitable type of glass. Window 200 may be clear tempered glass, coated tempered glass, frosted tempered glass, laminated tempered glass, or any other suitable type of glass. Window 200 may be a transparent or translucent member such as, for example, transparent glass or plastic. For example, window 200 may include one or more of a glass polymer composite, a polycarbonate, a fiber reinforced polymer, fiberglass, poly (methyl methacrylate), and acrylic material. For example, window 200 may include Plexiglas®, Lucite®, or Perspex®. Also, for example, window 200 may be substantially entirely formed from acrylic materials or substantially entirely formed from polycarbonate materials. Because window 200 may be transparent or translucent, a portion (e.g., an underwater portion) of the exemplary disclosed fluid container may be viewed through window 200. Window 200 may be formed, for example, from a transparent material that may be a see-through material, or a material having a property of being able to transmit rays of light through it so that elements disposed beyond the material can be clearly and distinctly seen. Also, window 200 may be formed, for example, from a translucent material that may permit light to pass through it, but the material diffuses the light so that elements disposed beyond the material are partially visible (e.g., can be seen, but may not be clearly and distinctly seen through the material). Window 200 may have any suitable thickness such as, for example, between about ¼" and about 1½" or more, between about ½" and about ¾", or any other suitable thickness for resisting the exemplary disclosed forces. Window 200 may be formed in any desired shape such as, for example, a rectangular shape, a circular or elliptical shape, a triangular shape, a polygonal shape, an artistic outline (e.g., of a fish or animal), an irregular shape, or any other desired shape.

As illustrated in FIG. 1, frame assembly 300 may include a frame member 305 and a retainer member 310. Based on the exemplary disclosed attachment to frame member 305 for example as described herein, retainer member 310 may increase a structural integrity of apparatus 105 and/or help prevent leakage of fluid from apparatus 105. Frame member 305 and retainer member 310 may be fastened together via a plurality of fasteners 312 as further described below. Frame assembly 300 may be formed with four sides to include an enclosed top that may, or may not, support a structural load. Also for example, frame assembly 300 may include three sides with no enclosed top.

Each fastener 312 may be any suitable mechanical fastener such as, for example, a threaded bolt (e.g., a partially or substantially entirely threaded bolt), a threaded screw, or any other suitable fastener. In at least some exemplary embodiments, fastener 312 may be a machine screw. Fasteners 312 may be threadably received in and fastened to apertures and components of frame member 305 and retainer member 310 for example as described below. Also for example, frame member 305 and retainer member 310 may be attached via adhesive, welding, snap-fit connections, and/or any other suitable attachment technique.

Figure 2:
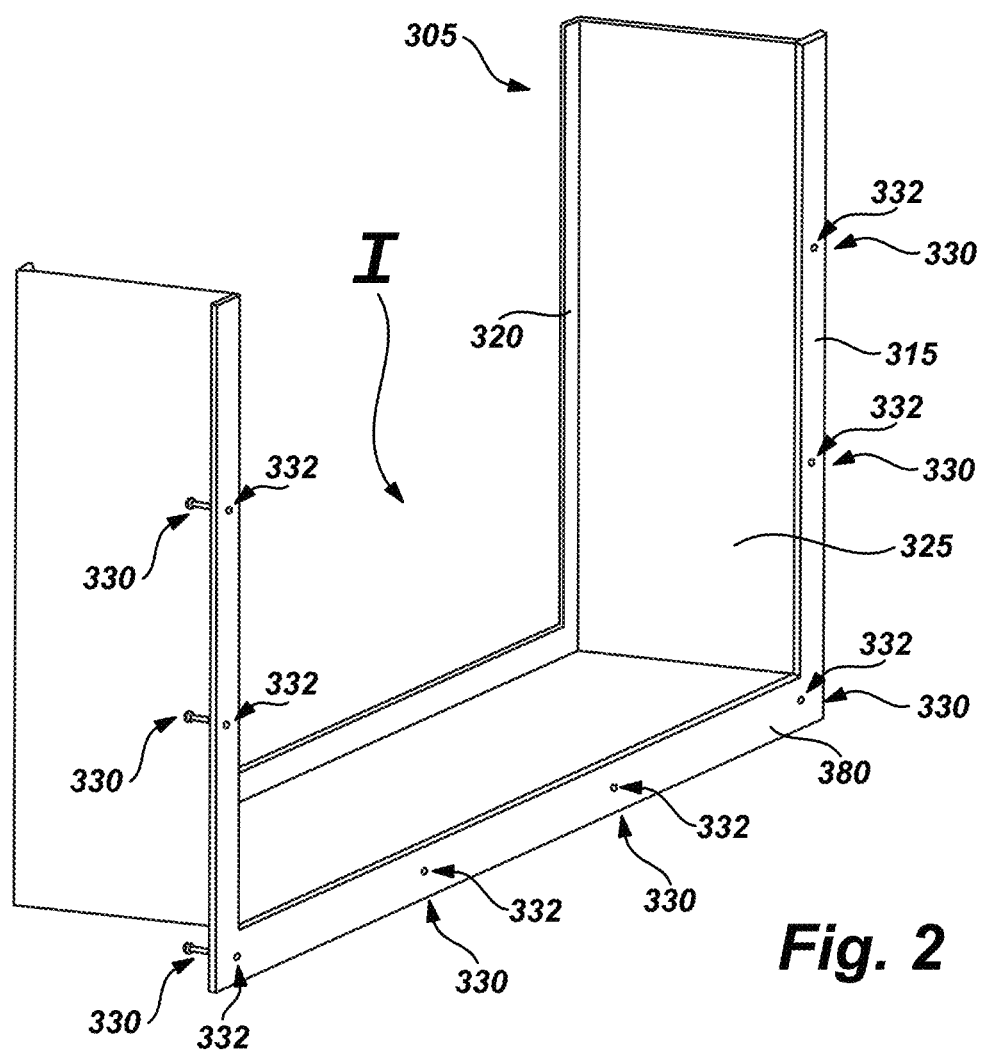
FIG. 2 is a perspective view of a portion of the exemplary embodiment of FIG. 1.

As illustrated in FIGS. 1 and 2, frame member 305 may be formed from any suitable structural material such as, for example, metal, structural plastic, structural ceramic material, composite material, and/or any other suitable structural material. Frame member 305 may be formed from steel. In at least some exemplary embodiments, frame member 305 may be formed from stainless steel (e.g., 316 stainless steel or 304 stainless steel). Multiple frame members 305 may be formed from a steel plate (e.g., a 4'×8' steel plate) have any suitable thickness such as, for example, between about ⅓₂" and about 1", between about ¹⁄₁₆" and about ³⁄₁₆", between about ¼" and about ½", or any other suitable thickness. Frame member 305 may be an integrally formed member or may be a built-up shape formed by multiple members attached via any suitable technique (e.g., welding, mechanical fasteners, and/or any other suitable attachment technique). In at least some exemplary embodiments, frame member 305 may be an integral member and/or welded plurality of members formed from one or more stainless steel plates.

Frame member 305 may be generally formed in a U-shape and may be configured (e.g., dimensioned) to receive window 200, for example as illustrated in FIGS. 1 and 2. Frame member 305 may be formed in a desired shape corresponding to window 200 that may be of any desired shape for example as described above. Frame member 305 may include a container flange 315 and a window flange 320 that may be connected by an interior wall 325, which may be formed from the exemplary disclosed material described above. Interior wall 325 may be dimensioned to generally correspond to a wall width of the exemplary disclosed fluid container described herein. Window flange 320 may be a flange of any suitable width for receiving and supporting window 200 such as, for example, between about ¾" and about 2", between about 1" and about 1½", about 1¼", or any other suitable width. When installed for example as described below, window 200 may be supported on a surface of interior wall 325 and may be sealed against window flange 320. As illustrated in FIG. 2, window flange 320 may extend from interior wall 325 toward an interior I of frame member 305, and container flange 315 may extend from interior wall 325 away from interior I of frame member 305. For example as illustrated in FIG. 2, window flange 320 and container flange 325 may extend in opposite directions from interior wall 325.

Container flange 315 may be generally similar to window flange 320. Container flange 315 may be a flange of any suitable width for facilitating attachment to the exemplary disclosed wall of the exemplary disclosed fluid container such as, for example, between about ½" and about 3", between about 1" and about 2", about 1¼", about 2", or any other suitable width. Container flange 315 may include one or more (e.g., a plurality of) anchor assemblies 330 and one or more frame apertures 332. Anchor assemblies 330 may be aligned with respective frame apertures 332 as described further below. Anchor assemblies 330 may be formed from materials similar to as described above regarding frame member 305. Anchor assemblies 330 may be spaced to correspond to dimensions of the exemplary disclosed wall blocks or other components as described further below.

Figure 3:
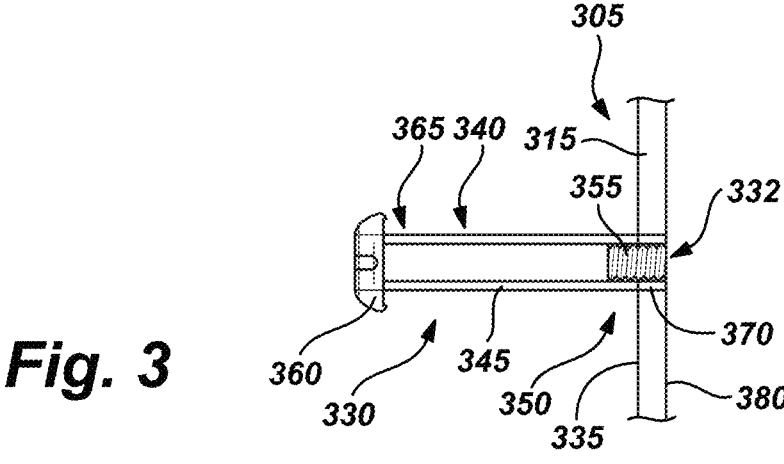
FIG. 3 is a sectional, detailed view of a component of the portion illustrated in FIG. 2.

As illustrated in FIGS. 2 and 3, each anchor assembly 330 may be disposed at a wall surface 335 of container flange 315. Wall surface 335 may face and abut the exemplary disclosed wall interior of the exemplary disclosure fluid container for example as described herein (e.g., wall surface 335 may face the side of the exemplary disclosed wall that faces retained fluid as described herein). As illustrated in FIG. 3, each anchor assembly 330 may include a post 340 that may be attached to wall surface 335 of container flange 315 and may extend away from wall surface 335. Post 340 may be disposed (e.g., attached) substantially perpendicularly (e.g., or at an angle) to container flange 315. Post 340 may serve as an anchoring binding post to be attached to the exemplary disclosed wall of the exemplary disclosed fluid container for example as described herein.

As illustrated in FIG. 3, post 340 may include a shaft 345. Shaft 345 may be a substantially fully hollow or partially hollow shaft that may receive a portion of fastener 312 described below. A wall end portion 350 of shaft 345 may be attached at wall surface 335 of container flange 315. Wall end portion 350 may be welded to wall surface 335 of container flange 315 or attached via any other suitable technique. In at least some exemplary embodiments, an entire perimeter of the end of wall end portion 350 of shaft 345 may be welded to container flange 315 at wall surface 335 so that a substantially watertight welded connection is provided. Wall end portion 350 may be penetrated into frame aperture 332 and welded to wall surface 335, or may be welded as flush mounted at wall surface 335 without wall end portion 350 being penetrated into frame aperture 332 (e.g., or may be welded using any other suitable technique and configuration for attaching post 340 to container flange 315). An interior surface 355 of shaft 345 (e.g., hollow shaft 345) at wall end portion 350 may be threaded (e.g., so as to threadably receive a threaded portion of fastener 312 as described below). Post 340 may also include a head 360 disposed at a head end portion 365 of shaft 345 that may be at an opposite end of post 340 as wall end portion 350. Head 360 may be integrally formed with shaft 345 or attached to shaft 345 via any suitable technique such as, for example, welding. Head 360 may have a larger width (e.g., diameter) than a width (e.g., diameter) of shaft 345 so that outer edges of head 360 extend out from shaft 345.

As illustrated in FIG. 3, wall end portion 350 may be attached to wall surface 335 of container flange 315 at a location of frame aperture 332 so that the hollow interior (e.g., hollow interior portion) of shaft 345 is substantially aligned with frame aperture 332. A given shaft 330 may penetrate into wall surface 335 or may attach flush with wall surface 335. An interior wall portion 370 of container flange 315 forming frame aperture 332 may include threading similar to interior surface 355 of shaft 345. Interior wall portion 370 and interior surface 355 may thereby form a threaded surface that may threadably receive fastener 312.

Retainer member 310 may be formed from similar material as described above regarding frame member 305. In at least some exemplary embodiments, retainer member 310 may be formed from stainless steel or from plastic (e.g., HDPE, LDPE, Nylon, PVC, and/or any other suitable structural plastic material, from which frame member 305 may also be formed in at least some exemplary embodiments). Retainer member 310 may have a shape similar to container flange 315. For example, retainer member 310 may be configured to align with container flange 315 (e.g., retainer member 310 and container flange 315 may have a similar configuration and dimensions). For example, retainer member 310 and container flange 315 may both be U-shaped members (or similarly shaped members of any desired shape). When retainer member 310 is attached to container flange 315 for example as described herein, a retainer attachment surface 375 of retainer member 310 may face a flange attachment surface 380 of container flange 315 (e.g., flange attachment surface 380 may be an opposite surface of container flange 315 as wall surface 335, and retainer attachment surface 375 may be an opposite surface of retainer member 310 as a fluid-side surface 385 of retainer member 310).

Figure 5:
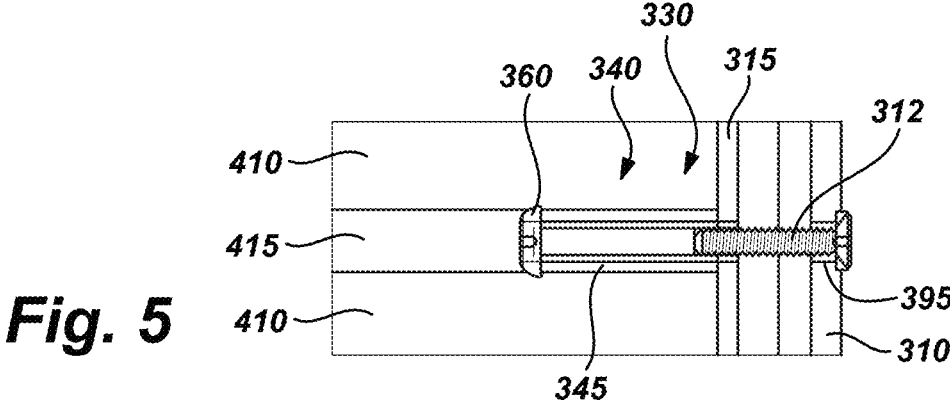
FIG. 5 is a sectional, detailed view of the assembled exemplary embodiment of FIG. 4.

Retainer member 310 may include one or more retainer apertures 390 that may be similar to frame apertures 332. As illustrated in FIG. 5 (e.g., showing an exemplary attachment of retainer member 310 to container flange 315), an interior retainer portion 395 of retainer member 310 forming retainer aperture 390 may include threading similar to interior surface 355 of shaft 345. Interior retainer portion 395, interior wall portion 370 of container flange 315, and interior surface 355 of shaft 345 may thereby form threaded surfaces that may threadably receive fastener 312. Also for example as illustrated in FIGS. 1 and 5, when retainer member 310 is attached to container flange 315, frame apertures 332 may be aligned with respective retainer apertures 390 so that fasteners 312 may be received through respective frame apertures 332 and retainer apertures 390, and in respective posts 340.

Returning to FIG. 1, one or more (e.g., a plurality) of offset members 398 may be utilized in attaching window 200 to window flange 320 of frame member 305. Offset members 398 may be flexible or elastic members. For example, offset member 398 may be formed from natural or synthetic rubber or elastomeric material. In at least some exemplary embodiments, offset member 398 may be formed from rubber, neoprene, polyurethane, polybutadiene, silicone, and/or any other suitable flexible or elastic material.

Figure 4:
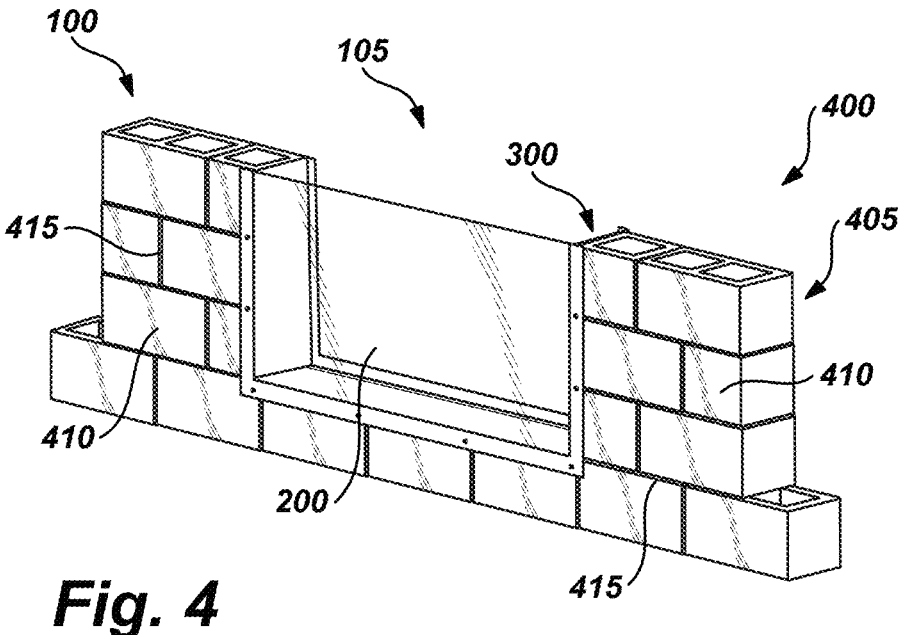
FIG. 4 is perspective, assembled view of the exemplary embodiment of FIG. 1.
Figure 6:
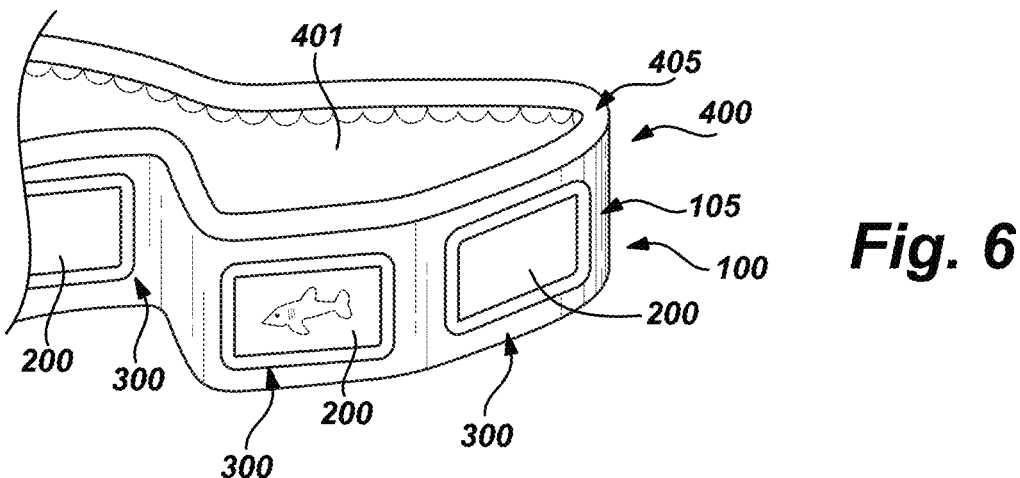
FIG. 6 is a perspective view of an exemplary embodiment of the present invention.

FIGS. 4-6 illustrate an exemplary installation of system 100 including apparatus 105 (e.g., including window 200 and frame assembly 300) as part of a fluid container 400. Fluid container 400 may be any suitable structure for retaining a fluid 401 (e.g., water or salt water) such as, for example, a pond, a pool, a lake, an aquarium, a water treatment facility, an aquaculture facility, a training facility for water sports and/or maritime activities, and/or any other suitable structure or reservoir for holding a fluid. Fluid container 400 may be a hardscaping feature for a residential or commercial area (e.g., a fluid container such as a fish pond for a yard or other location). For example, the exemplary disclosed system, apparatus, and method may be used in any suitable fish pond (e.g., a koi pond).

In at least some exemplary embodiments, fluid container 400 may be formed by one or more container walls 405. Container wall 405 may be any suitable wall for forming a substantially watertight barrier with the exemplary disclosed liner described herein for holding (e.g., retaining) fluid 401. In at least some exemplary embodiments, container wall 405 may be partially (e.g., or substantially entirely) formed from wood, cast concrete (e.g., pre-cast, poured concrete), soil mound, and/or any other suitable material. In at least some exemplary embodiments, container wall 405 may be partially or substantially entirely formed from a plurality of wall blocks 410 that may be attached to each other via curable material 415. Wall blocks 410 may include prefabricated material such as cinderblocks, concrete blocks, stones, bricks, and/or any other suitable material for retaining fluid. Wall block 410 may be a concrete masonry unit (e.g., CMU, concrete block, or cinderblock). In at least some exemplary embodiments, wall block 410 may be a concrete masonry unit having dimensions of about 8"×8"×16". Curable material 415 may be grout, mortar, concrete, and/or any other suitable material. Curable material 415 may be any suitable cementitious material or epoxy-based material. Curable material 415 may include materials such as epoxy, acrylic, polyurethane, caulk, furan, and/or any other suitable material for attaching wall blocks 410 together. In at least some exemplary embodiments, curable material 415 may be Type S mortar. In at least some exemplary embodiments, curable material 415 may be applied during installation in layers of between about 1/16" and about 3/4" (e.g., about 3/8") or any other suitable thickness to attach wall blocks 410 together. During and after installation for example as illustrated in FIG. 5 and described further below, post 340 may be disposed in curable material 415 that may be disposed between wall blocks 410.

The exemplary disclosed system, apparatus, and method may be used in any suitable application for a window for a fluid container. The exemplary disclosed system, apparatus, and method may be used in any suitable application for landscaping such as, for example, hardscaping. The exemplary disclosed system, apparatus, and method may be used in any suitable application for retaining a fluid (e.g., water) such as, for example, a pond, a pool, a lake, an aquarium, a water treatment facility, a training facility for water sports and/or maritime activities, and/or any other suitable structure or reservoir for holding a fluid. For example, the exemplary disclosed system, apparatus, and method may be used in any suitable fish pond.

Figure 7:
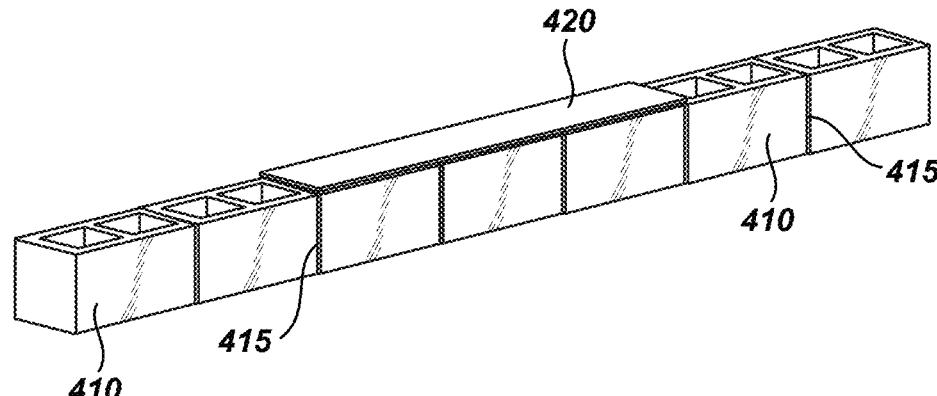
FIG. 7 is a perspective view of an exemplary step of an exemplary installation of the present invention.
Figure 8:
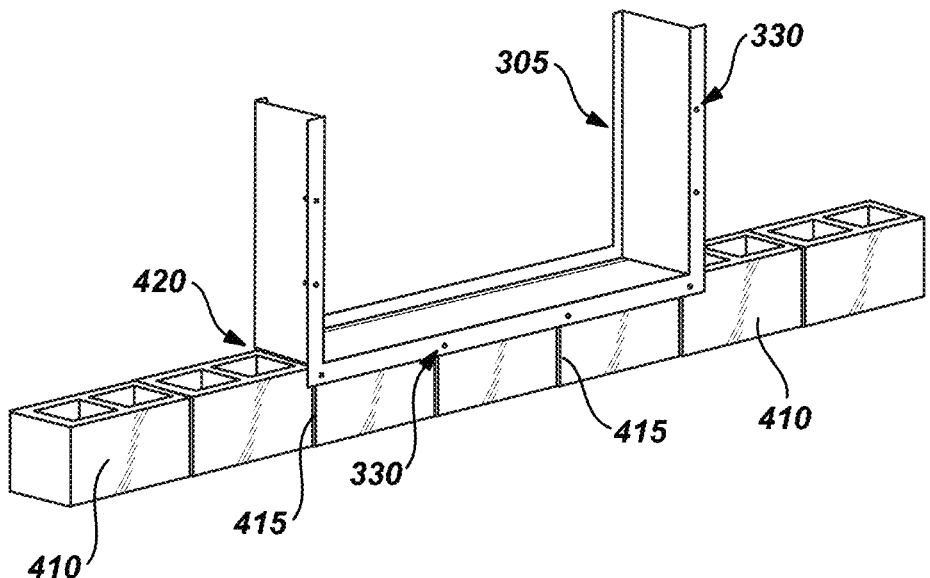
FIG. 8 is a perspective view of another exemplary step of the exemplary installation of the present invention.
Figure 23:
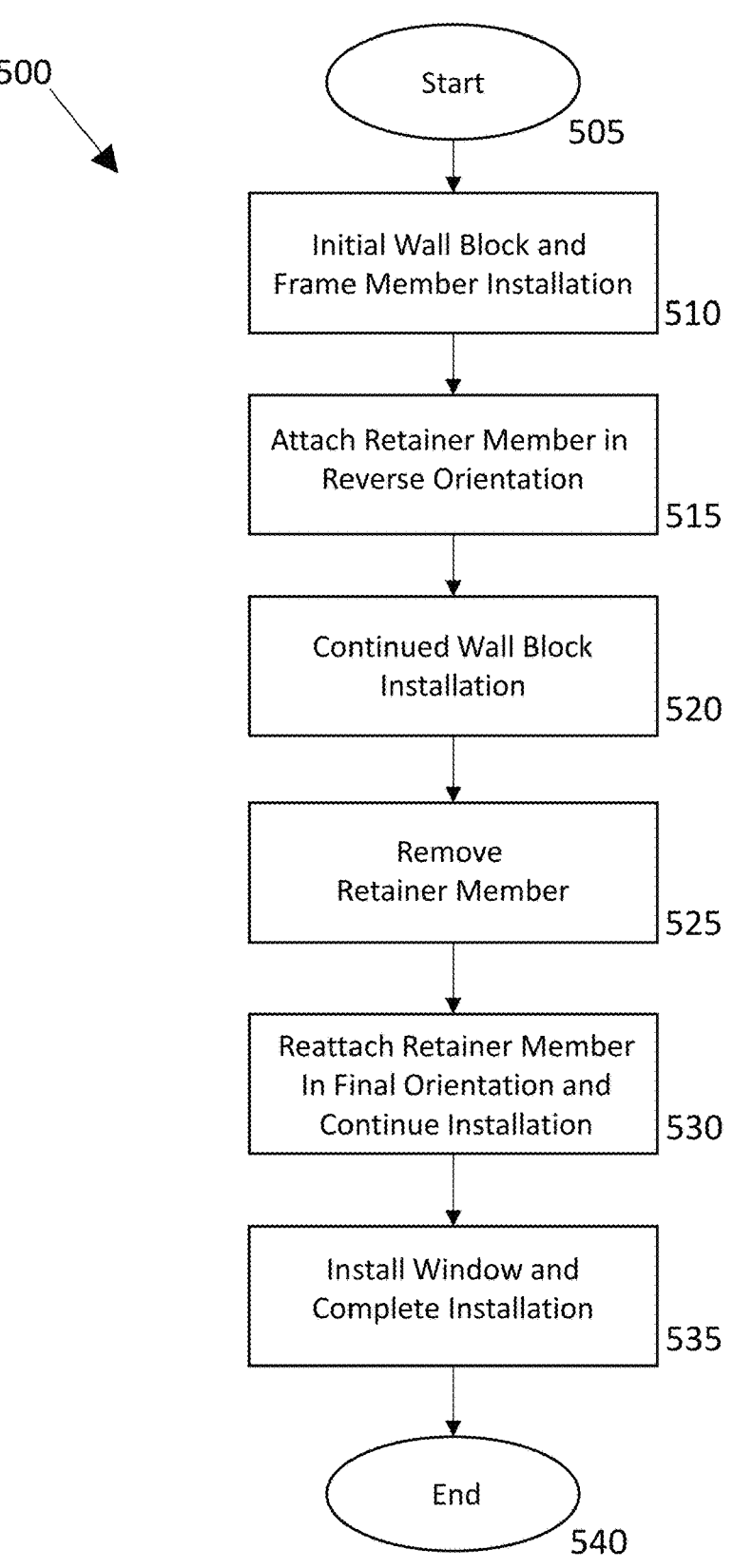
FIG. 23 illustrates an exemplary process of using at least some exemplary embodiments of the present disclosure.

FIG. 23 illustrates an exemplary process of installing and using the exemplary disclosed system and apparatus. Process 500 begins at step 505. At step 510, initial wall block installation and installation of frame member 305 may be performed. As illustrated in FIG. 7, a bottom layer (e.g., course) of wall blocks 410 may be placed, which may be set with a sill 420 that may be formed from curable material 415. For example, a worker may smooth sill 420 to a level surface (e.g., use a trowel to smooth grout sill and level surface). Sill 420 may be approximately 1/8" to 3/4" thick (e.g., about 3/8" or any other suitable thickness). Frame member 305 may be set for example as illustrated in FIG. 8 before sill 420 has cured (e.g., dried). Container flange 315 of frame member 305 may be disposed flush with an exterior of container wall 405 being installed using wall blocks 410.

A horizontal and/or vertical spacing between anchor assemblies 330 disposed on container flange 315 may correspond to dimensions of wall blocks 410 (e.g., that may correspond to standard dimensions of certain types of wall blocks). For example, anchor assemblies 330 may be spaced so that they will correspond to locations of seams (e.g., lines) of curable material 415 as illustrated in FIG. 8. Also for example, anchor assemblies 330 disposed at the intermediate (e.g., horizontal) portion of container flange 315 may be disposed in sill 420 when frame member 305 is set (e.g., so that they may be attached in sill 420 and/or vertical seams of curable material 415 as curable material 415 dries). Posts 340 may thereby be disposed and attached within sill 420 and/or curable material 415 before it is cured (e.g., as illustrated in FIG. 5 and as further described below), thereby also providing for attachment of posts 340 later when the exemplary disclosed curable material is cured.

Figure 9:
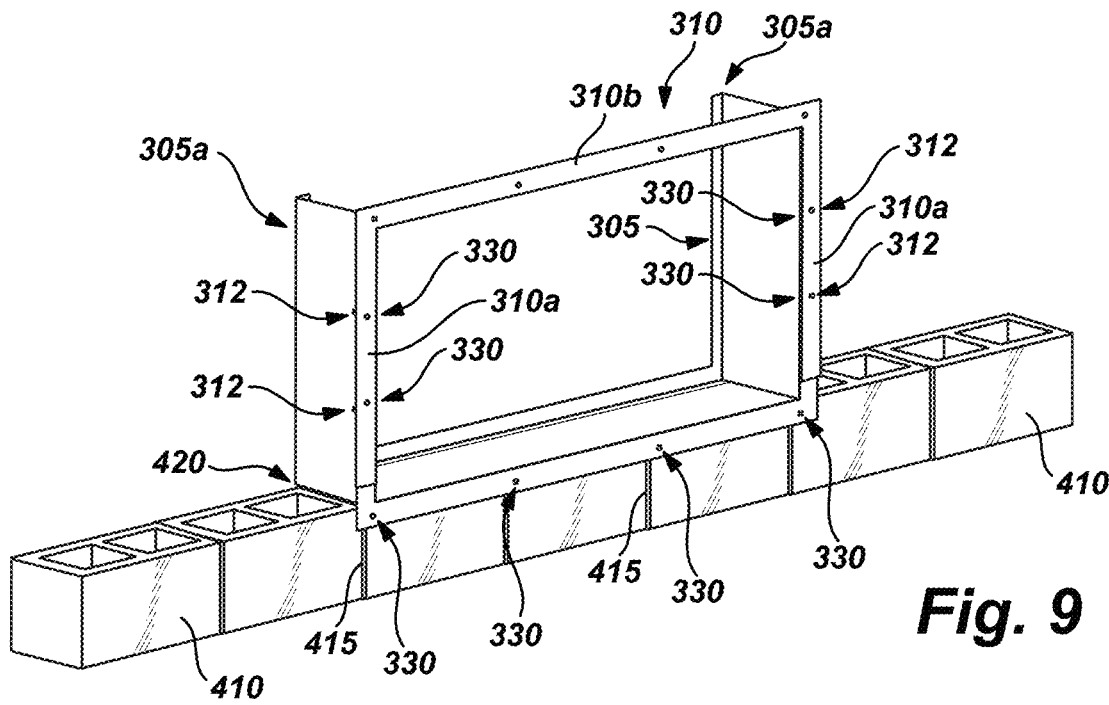
FIG. 9 is a perspective view of another exemplary step of the exemplary installation of the present invention.

Returning to FIG. 23 at step 515, retainer member 310 may be attached to frame member 305 in a reverse orientation as illustrated in FIG. 9. Retainer member 310 may be attached to frame member 305 via a plurality of fasteners 312 being received through respective frame apertures 332 and retainer apertures 390 and in respective posts 340. Threading of fastener 312 may be threadably received and fastened to exemplary disclosed threading of interior retainer portion 395 of retainer member 310, interior wall portion 370 of container flange 315, and interior surface 355 of shaft 345 for example as illustrated in FIGS. 5 and 9. Fasteners 312 may temporarily fasten (e.g., removably fasten) retainer member 310 to frame member 305. Fasteners 312 may be fastened at leg portions 310*a* (e.g., vertical portions or legs) of retainer member 310 and leg portions of frame member 305 for example as illustrated in FIG. 9. For example as illustrated in FIG. 9, four fasteners 312 may be used to temporarily fasten retainer member 310 to frame member 305.

For example as illustrated in FIG. 9, retainer member 310 may be temporarily attached via fasteners 312 in a reverse (e.g., upside down) position relative to a later final (e.g., permanent) installation position of retainer member 310. For example, an intermediate portion 310*b* (e.g., horizontal portion) of retainer member 310 may be disposed at a top position of frame member 305 (e.g., at an upper or relatively higher position of frame member 305 as compared to the exemplary final installation position described below). Based on the retainer member 310 being temporarily installed in this position, retainer member 310 may act as an upper or top strut to maintain frame member 305 in a substantially squared shape or position (e.g., to substantially avoid frame legs 305*a* of frame member 305 from moving or tilting from a vertical, squared position during installation). Being maintained in the exemplary disclosed substantially squared shape may maintain frame member 305 in a suitable position within desired tolerances for receiving window 200 (e.g., may avoid tilting and/or warping of frame member 305 that may later cause an undesirable final shape and/or improper fit of window 200 in frame member 305 and/or leakage through window 200 and frame member 305).

Figure 10:
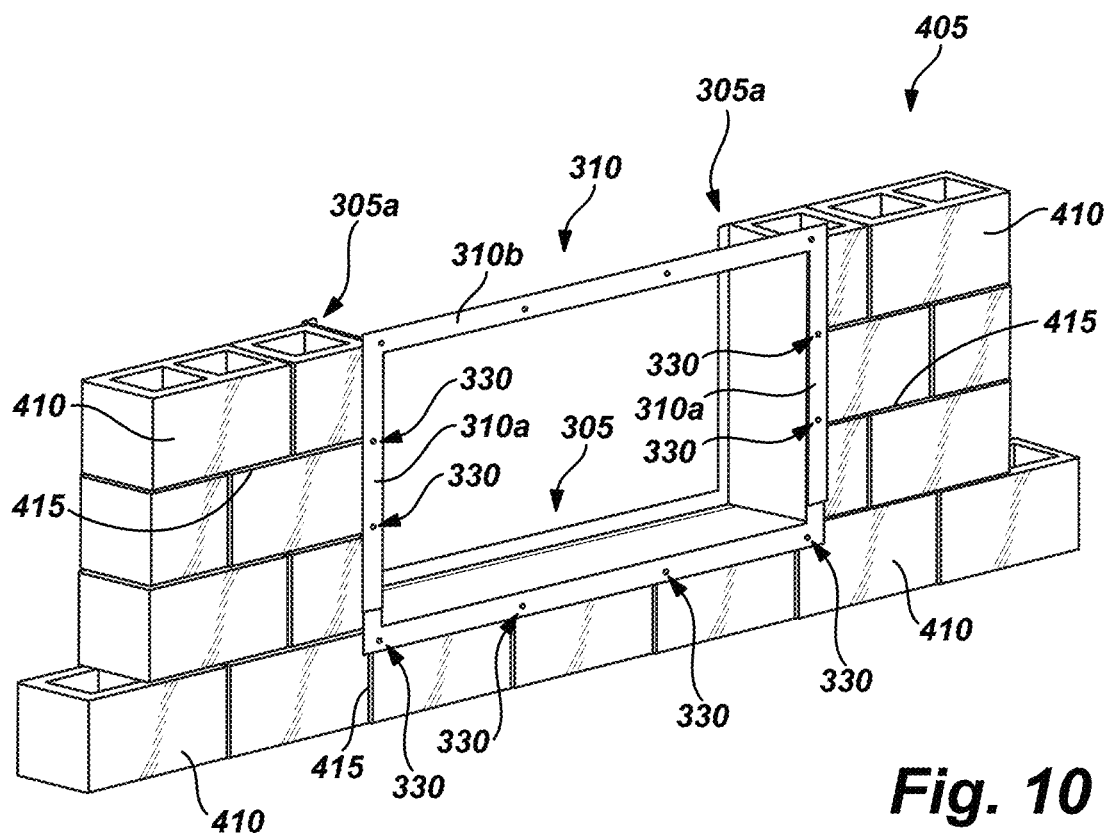
FIG. 10 is a perspective view of another exemplary step of the exemplary installation of the present invention.
Figures 11, 12:
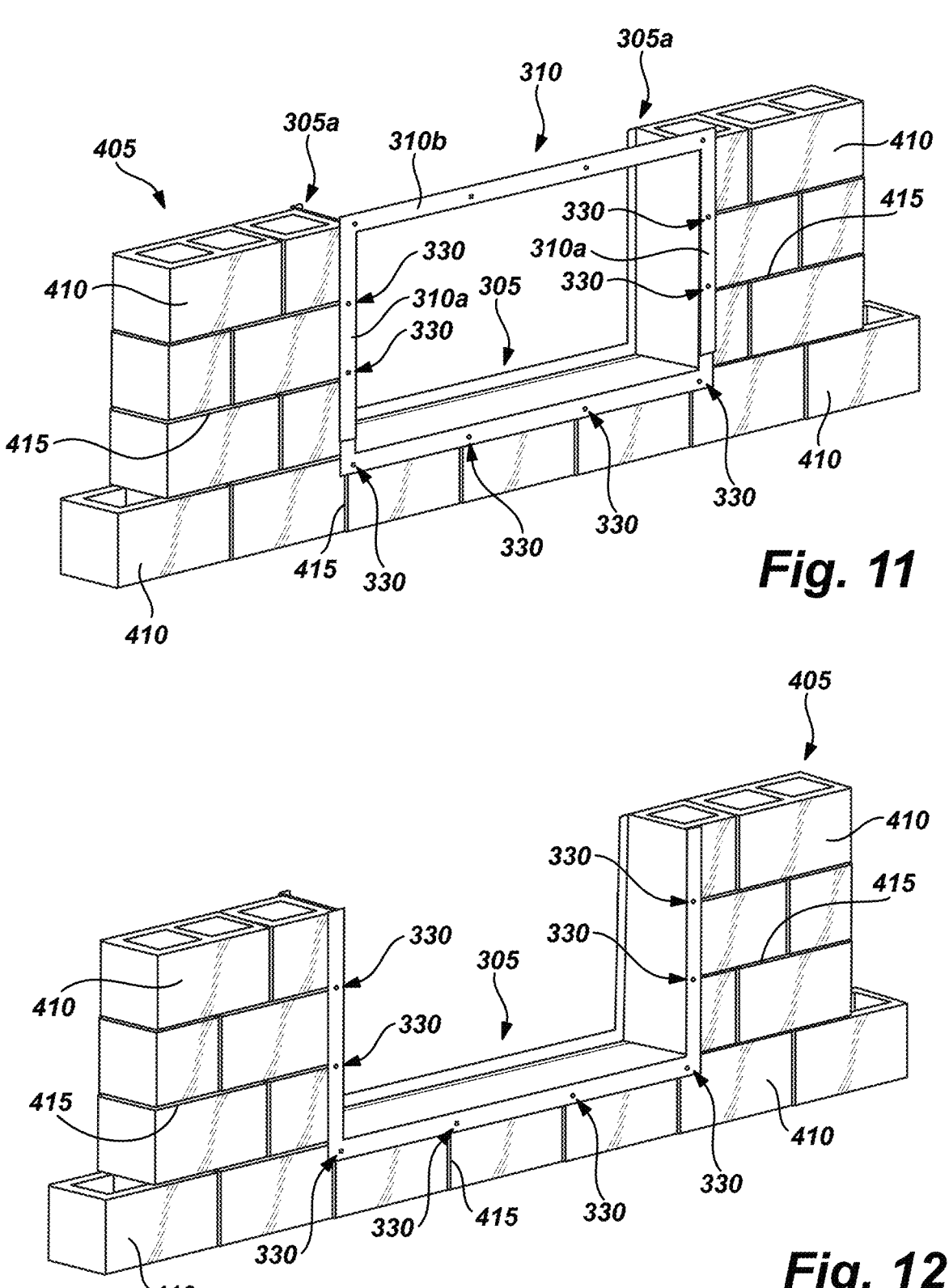
FIG. 11 is a perspective view of another exemplary step of the exemplary installation of the present invention.
FIG. 12 is a perspective view of another exemplary step of the exemplary installation of the present invention.

Returning to FIG. 23 at step 520, installation of additional wall blocks 410 may be performed. Further wall blocks 410 may be set using curable material 415 for example as illustrated in FIG. 10. Retainer member 310 may continue to maintain frame member 305 in a substantially squared shape based on being temporarily attached to frame member 305 via fasteners 312 as described above. Some or all posts 340 of respective anchor assemblies 330 may be set in curable material 415 disposed between wall blocks 410 for example as illustrated in FIG. 10 (e.g., and FIG. 5). Next for example, as illustrated in FIG. 11, wall blocks 410 may be filled with material similar (e.g., or not similar) to curable material 415 including, for example, grout and/or concrete. The exemplary disclosed curable material may be allowed to cure for any suitable amount of time such as, for example, overnight or more than a day (e.g., a day or a few days or longer). As the exemplary disclosed curable material cures, retainer member 310 may continue to maintain frame member 305 in a substantially squared shape. After the exemplary disclosed curing time period has passed, process 500 may proceed to step 525. At this point, the exemplary disclosed assembled portion of container wall 405 may be substantially cured, and may itself maintain frame member 305 in a substantially (e.g., and permanently) squared shape.

Returning to FIG. 23 at step 525, temporarily fastened fasteners 312 may be removed (e.g., based on removing fasteners 312) and retainer member 310 may be detached from frame member 305 (e.g., as illustrated in FIG. 12). At this point, each post 340 (e.g., some or all posts 340) of respective anchor assemblies 330 may be attached within cured curable material 415 for example as illustrated in FIGS. 5 and 12. Detached retainer member 310 and removed fasteners 312 may be stored (e.g., temporarily set aside) as installation continues as described below.

Figure 13:
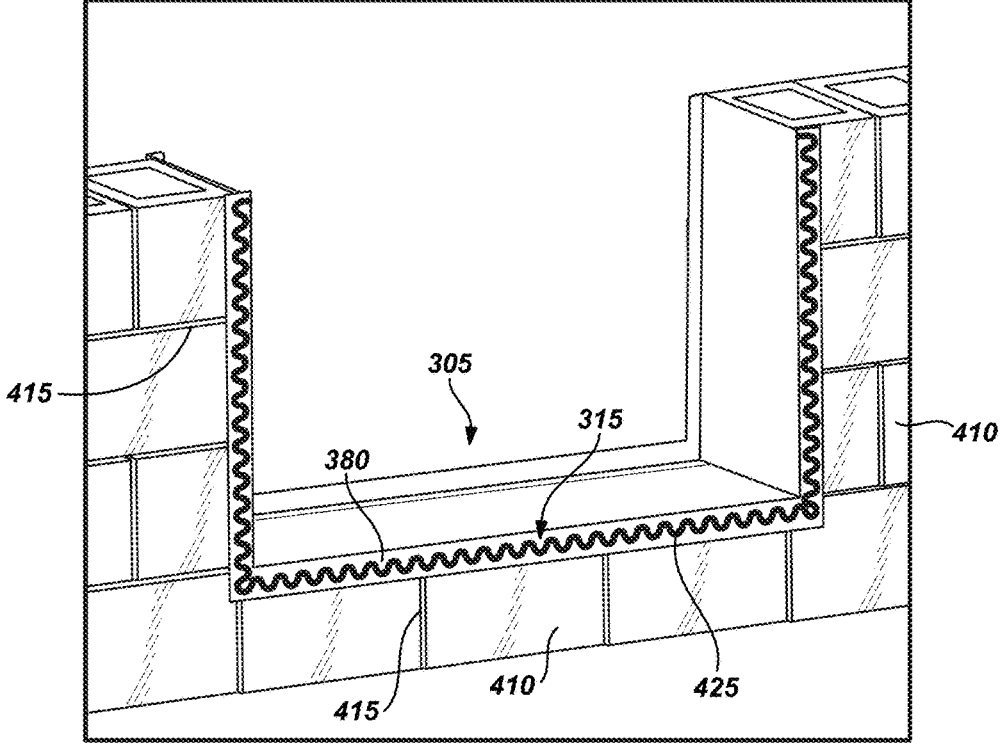
FIG. 13 is a perspective view of another exemplary step of the exemplary installation of the present invention.
Figure 14:
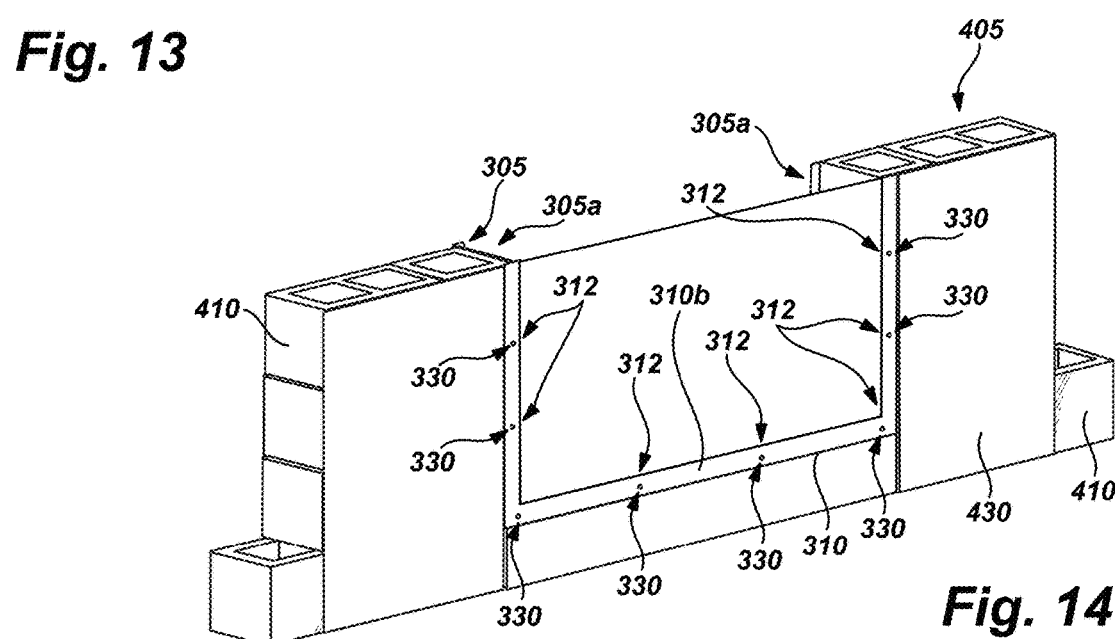
FIG. 14 is a perspective view of another exemplary step of the exemplary installation of the present invention.
Figure 15A:
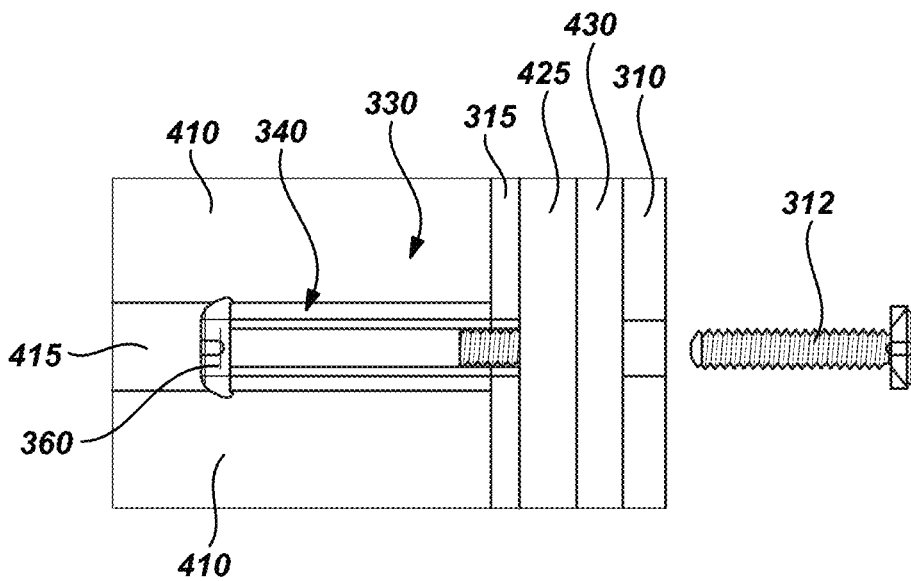
FIGS. 15A and 15B are sectional, detailed views of the exemplary installation of the present invention.
Figure 15B:
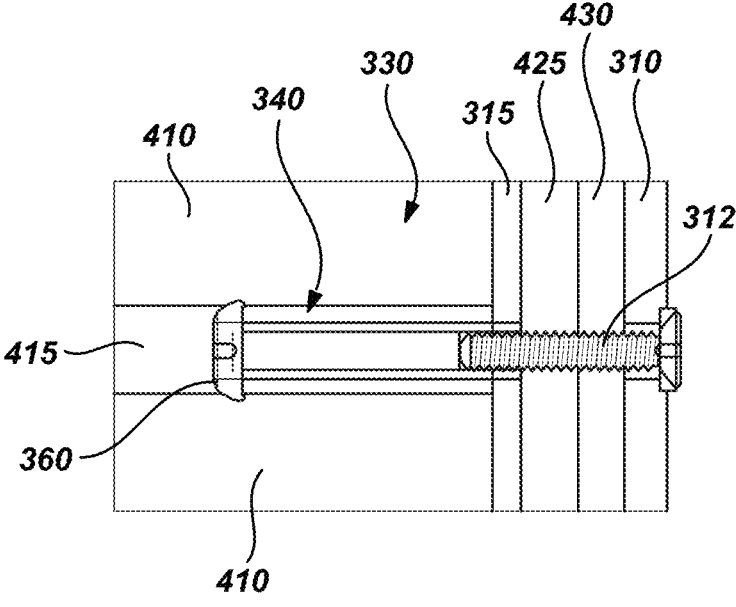

Returning to FIG. 23 at step 530, installation may be continued, during which retainer member 310 may be permanently reattached as described below. The exemplary disclosed liner described below may be prepared for installation (e.g., cut to a desired shape based on a configuration of fluid container 400 being constructed). As illustrated in FIG. 13, a sealant 425 may be applied to flange attachment surface 380 of container flange 315. Sealant 425 may be formed from polyurethane-based material, MS polymer-based material, silicone-based material, and/or any other suitable type of sealant material. Sealant 425 may be generously applied in a serpentine (e.g., S-shaped) pattern, a straight line, multiple parallel straight lines, or in any other suitable pattern. Retainer attachment surface 375 and flange attachment surface 380 may be abraded, scratched, scored, and/or otherwise prepared for adhering to sealant 425 and/or liner 430. Next for example as illustrated in FIG. 14, a fluid container liner such as a liner 430 (e.g., previously configured for example as described above) may be placed against container wall 405. Liner 430 may be a flexible plastic material (e.g., HDPE, LDPE, PVC, or other suitable plastic material), a flexible rubber material (e.g., butyl, EPDM, or other suitable rubber material), or any other suitable liner material. Liner 430 may include multiple materials (e.g. LDPE and HDPE with woven reinforcement). Liner 430 may include curable material (e.g. fiberglass, spray-on cement-based liners, poured cement based-liners, and/or other suitable material). Liner 430 may be between about 5 mil and about 100 mil in thickness (e.g. 30 mil or 40 mil). After liner 430 is in place relative to container wall 405 (e.g., against and over uncured sealant 425), retainer member 310 may be permanently attached to frame member 305 via fasteners 312. For example as illustrated in FIGS. 14, 15A, and 15B, retainer member 310 may be attached to frame member 305 via a plurality of fasteners 312 being received through respective frame apertures 332 and retainer apertures 390 and in respective posts 340. Fasteners 312 may also be fastened (e.g., inserted) through sealant 425 and liner 430. Threading of each fastener 312 may be threadably received and fastened to exemplary disclosed threading of respective interior retainer portion 395 of retainer member 310, interior wall portion 370 of container flange 315, and interior surface 355 of shaft 345 for example as illustrated in FIG. 15B. Fasteners 312 may permanently fasten retainer member 310 to frame member 305 (e.g., via application of any suitable amount of torque). Fasteners 312 may be fastened at the exemplary disclosed horizontal and vertical portions of retainer member 310 and frame member 305. For example as illustrated in FIG. 14, eight (e.g., or any other suitable number of) fasteners 312 may be used to permanently fasten retainer member 310 to frame member 305. Sealant 425 and liner 430 may be pressed between retainer member 310 and container flange 315 when retainer member 310 is fastened to container flange 315 via fasteners 312.

Retainer member 310 may be permanently attached via fasteners 312 in a final installation (e.g., right side up) position relative to the temporary position described above at step 515. For example, intermediate portion 310*b* (e.g., horizontal portion) of retainer member 310 may be disposed at a bottom position of frame member 305 (e.g., so that intermediate portion 310*b* of retainer member 310 is adjacent to an intermediate portion of frame member 305 that is disposed between frame legs 305*a*). For example, substantially an entire length (e.g., U-shaped length) of retainer member 310 may face (e.g., be adjacent to) a corresponding entire substantial length of container flange 315. As illustrated in FIG. 15B, head 360 of each post 340 may help to anchor each post 340 in cured curable material 415 based on its relatively larger diameter compared to shaft 345, which may help to securely anchor frame assembly 300 in container wall 405. Certain posts 340 may not include head 360 for example for case of installation and to minimize disturbance of uncured curable material 415. For example, some (e.g., four or more) or all of the posts 340 may be horizontally aligned along a bottom of retainer member 315, and may not have head 360 included on each post 340 (e.g., to allow posts 340 to be pushed into the first row or course of wall blocks with uncured curable material 415). Friction and pressure from curable material 415 may also provide an anchoring force on post 340 with or without head 360. The exterior surface of post 315 may be abraded, scratched, scored or otherwise prepared to increase friction forces on between post 315 and curable material 415.

Figures 16, 17:
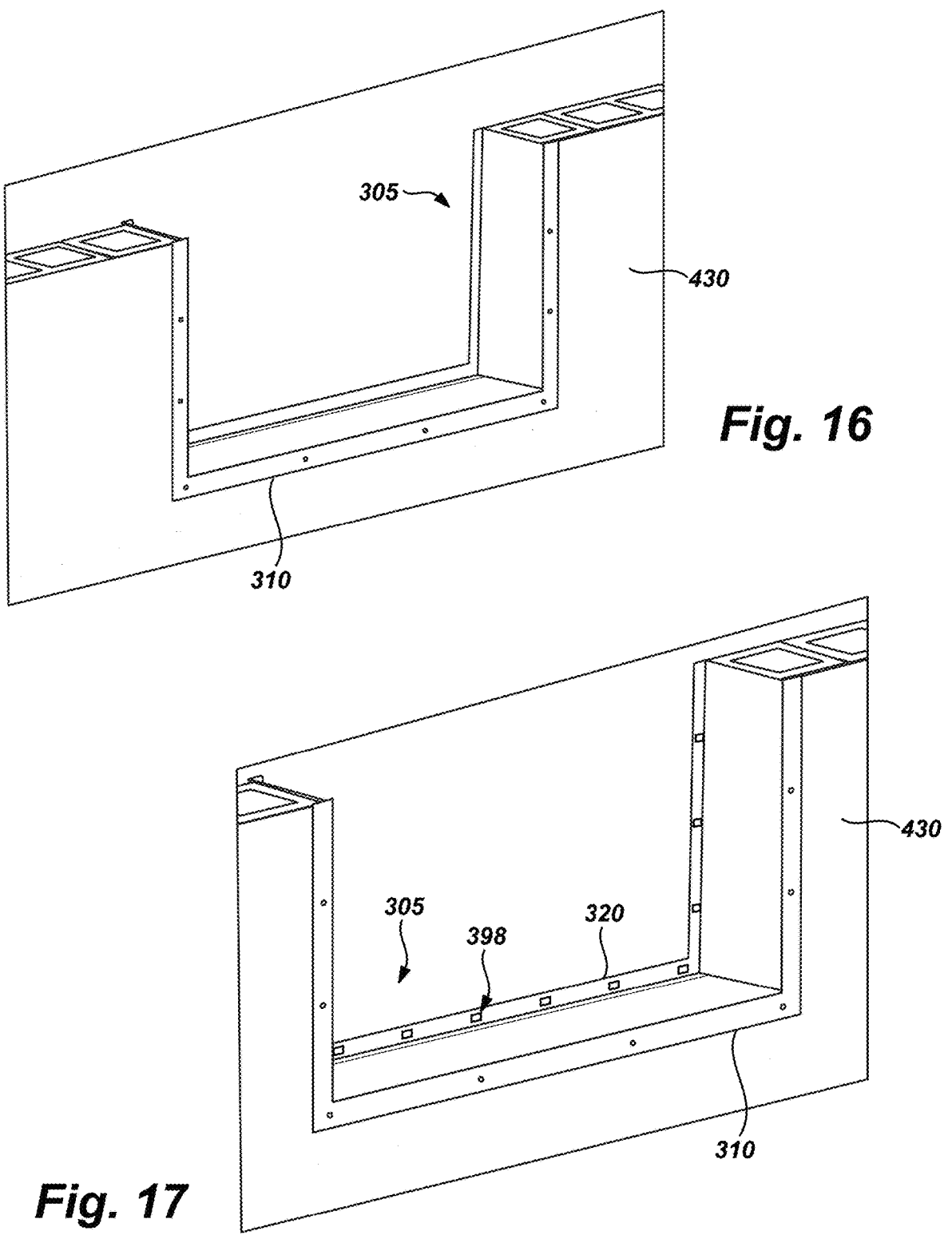
FIG. 16 is a perspective view of another exemplary step of the exemplary installation of the present invention.
FIG. 17 is a perspective view of another exemplary step of the exemplary installation of the present invention.

As illustrated in FIG. 16, liner 430 may be cut at an inside (e.g., a perimeter) of retainer member 310. Excess sealant 425 may be removed as suitable.

Returning to FIG. 23 at step 535, window 200 may be installed. As illustrated in FIG. 17, offset members 398 may be placed (e.g, adhered via any suitable adhesive or technique) at any desired spacing (e.g., between about 6" and about 12", about 8", or any other suitable spacing). For example, between about 8 and 16 (e.g., about 12) offset members 398 may be placed. Sealant that may be generally similar to sealant 425 may be applied to window flange 320 (e.g., using 1 or more beads or straight line(s) of sealant to be compressed by window 200 on a perimeter of interior wall 325 adjacent to window flange 320 and one or more beads of window flange 320, or any other suitable application may be used). For example, the exemplary disclosed sealant may fully encase or seal offset member 398.

Figures 18, 19, 20, 21:
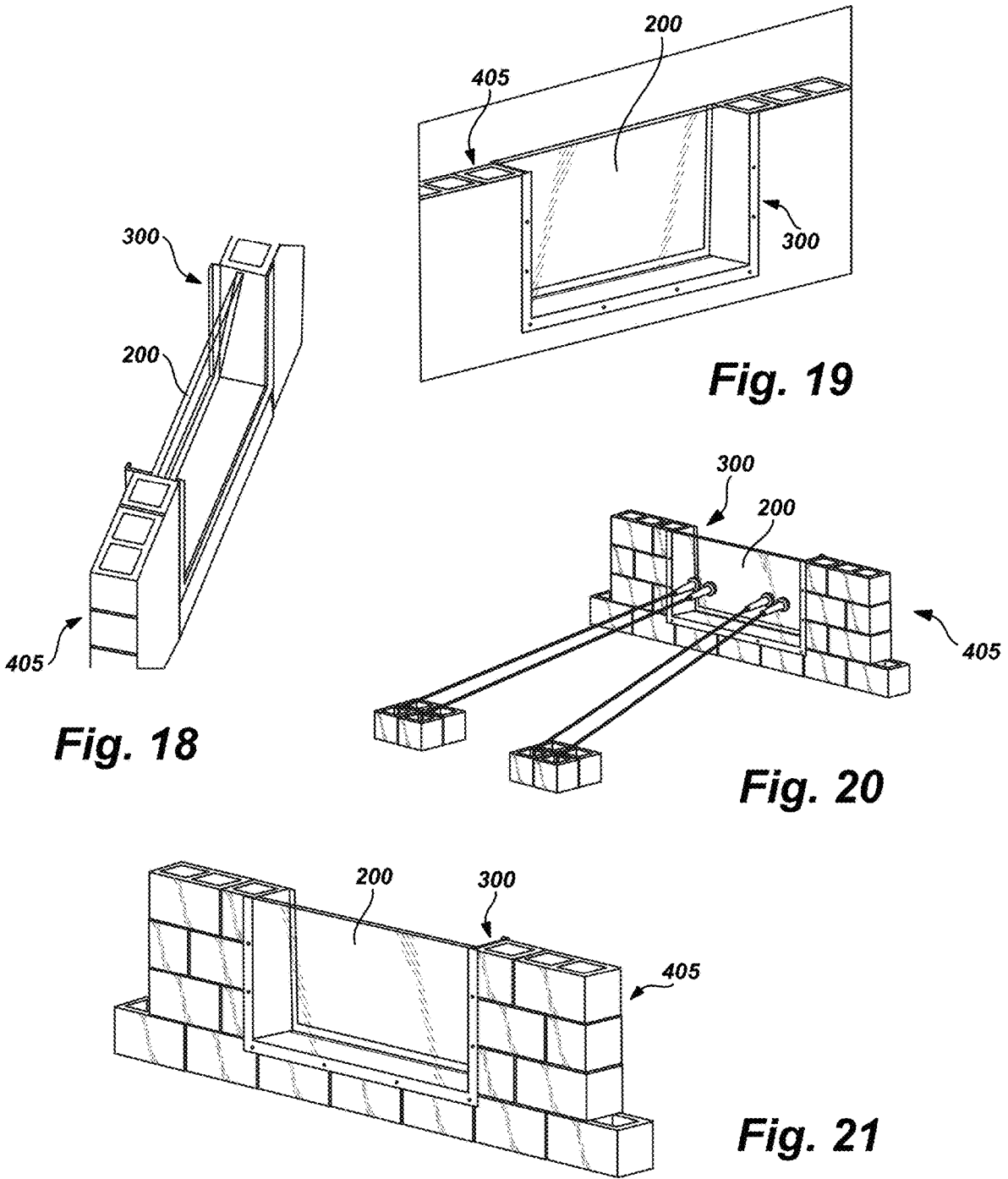
FIG. 18 is a perspective view of another exemplary step of the exemplary installation of the present invention.
FIG. 19 is a perspective view of another exemplary step of the exemplary installation of the present invention.
FIG. 20 is a perspective view of another exemplary step of the exemplary installation of the present invention.
FIG. 21 is a perspective view of another exemplary step of the exemplary installation of the present invention.

As illustrated in FIG. 18, any suitable technique may be used to install (e.g., carefully install) window 200. For example, window 200 may be installed by lowering window 200 at a slight angle onto a bottom corner of the exemplary disclosed frame member (e.g., at an interior corner formed between window flange 320 and interior wall 325). As illustrated in FIG. 19, window 200 may then be slowly brought to a vertical position, which may allow the exemplary disclosed sealant to be pressed uniformly and air bubbles to be squeezed out. For example, window 200 may be maintained in this position until installation is completed as described below.

As illustrated in FIG. 20, window 200 may be maintained in the exemplary disclosed vertical position described above until the exemplary disclosed sealant is substantially fully cured. For example, any suitable suction cups (e.g., operable glass-rated suction cups) may be used. For example, suction cups may be attached via any suitable tension ropes or cables to weights (e.g., wall blocks 410 or any other suitable weights), which may provide force for maintaining window 200 in the exemplary disclosed desired position relative to frame assembly 300 (e.g., against window flange 320). For example by substantially centering the exemplary disclosed suction cups, substantially even distribution of pressure may provide for window 200 to be evenly adhered to the exemplary disclosed sealant. Excess sealant may be removed as suitable. Any desired covering (veneer) may be added to fluid container 400. In at least some exemplary embodiments, apparatus 105 including window 200 may extend slightly out from container wall 405 (e.g., by between about ⅛" and about 1", for example ¾" or any other desired amount that may be substantially equal to a thickness of the veneer), so that an exterior surface of window 200 may be flush or in any other desirable position relative to an exterior surface of the veneer.

As illustrated in FIG. 21, the exemplary disclosed suction cups and tension cables or ropes may be removed when sealant is substantially fully cured. When fluid container 400 is complete, it may be slowly filled with fluid (e.g., water) and monitored for leakage. Fluid container 400 may then be utilized for example as illustrated in FIG. 6. Window 200 may be cleaned as desired, using for example a scraper (e.g., a 4" glass scraper, brush, sponge or any other suitable tool) to remove algae when fluid container 400 is a fish pond. Returning to FIG. 23, process 500 ends at step 540.

Figure 22B:
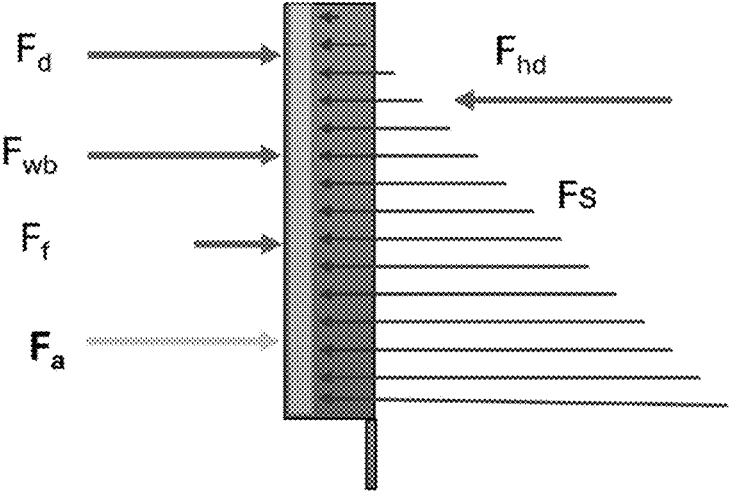
Figure 22C:
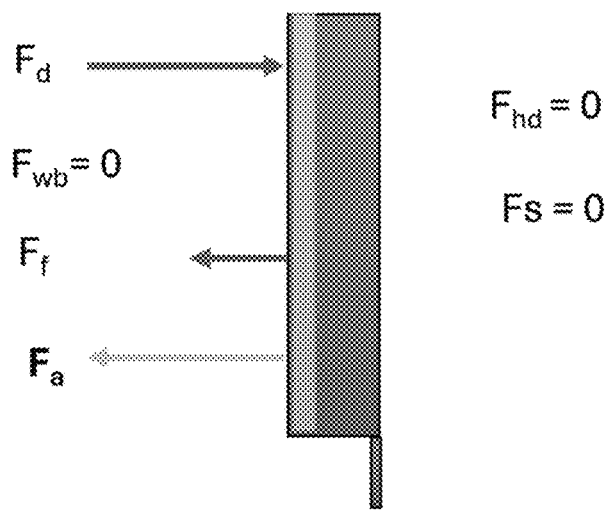

FIGS. 22A, 22B, and 22C illustrate exemplary forces on apparatus 105. As illustrated in FIG. 22, the exemplary disclosed anchoring of anchor assemblies 330 in container wall 405 (e.g., in cured curable material 415) may help to resist the exemplary disclosed forces (e.g., lateral forces from fluid of fluid container 400 and users, such as for example $F_s$, $F_{wb}$, $F_f$ $F_d$, $F_{hd}$, and $F_a$) to balance forces on fluid container 400 and to contribute to structural integrity and substantially prevent leakage through window 200. For example as illustrated in FIG. 22A, $F_a$ (anchor assembly 330 friction and anchoring forces) may serve as a balancing force (e.g., or forces). $F_a$ may provide additional resistance to movement in substantially all directions. For example, sudden losses of water due to maintenance, pump failure, liner failure or other undesirable losses of water may cause significant changes in forces (e.g., that may result in overwhelming force into the pond and thus damage or dislodge portions of the frame assembly, liner or curable materials), which may be resisted by $F_a$. For example, $F_a$ may resist these forces to substantially prevent this damage. $F_a$ may further resist net changes in forces due to dynamic forces as illustrated in FIG. 22A (forces due to gravity and moments on the system, and the wall block, sealant, and liner are not shown for purposes of clarity). As illustrated in FIG. 22B during normal pond operation, $F_a$ may supplement other forces to resist movement and damages due to pond forces or an extreme force due to $F_d$. As illustrated in FIG. 22C when the exemplary disclosed fluid container is substantially empty, there may be substantially no hydrodynamic or hydrostatic forces. $F_{wb}$ may be zero when the fluid container is empty. $F_a$ may provide significant resistance to $F_a$ to prevent movement and damages (otherwise, $F_a$ may overwhelm friction force $F_f$ and cause movement or damage).

In at least some exemplary embodiments, apparatus 105 may provide anchoring machine screw and binding posts (e.g., anchor assemblies 330) that may serve multiple purposes. For example, anchor assemblies 330 may provide a mechanical connection in curable material 415 that may be a grouted layer disposed between wall blocks 410 that may be concrete masonry units (e.g., cinder blocks). This may substantially reduce the potential for movement of the frame due to lateral forces such as a person leaning on apparatus 105, hydrostatic forces (e.g., different water pressures that may vary as a user establishes any suitable water depth up to a full or slightly surcharged level), and/or hydrodynamic forces (e.g., jets, bubblers, and/or forces due to organics such as fish). Anchor assemblies 330 may attach (e.g., permanently secure) a retaining flange (e.g., retainer member 310) to a frame (e.g., frame member 305). In doing so, a sealant (e.g., sealant 425) and a liner (e.g., liner 430) such as a pond liner may be compressed and also secured into position between the frame and the retaining flange. Installation alignment may be provided (e.g., ensured) by rotating the retaining flange (e.g., retainer member 310) about 180 degrees vertically (e.g., or any other desired rotation such as between about 45 degrees and about 270 degrees) and temporarily installing the retaining flange using some (e.g., four of eight or any other desired number) anchor assemblies 330 such as anchoring binding posts and fasteners (e.g., fasteners 312 such as machine screws). This may substantially prevent an open-top frame from shifting or bending (e.g., warping) out of alignment during an initial installation process for example as described above. For example, misalignment during installation, which may result in the frame no longer properly fitting a transparent barrier such as window 200, may be substantially prevented.

The invention includes other illustrative embodiments ("Embodiments") as follows.

Embodiment 1: An apparatus for supporting a window in a fluid container formed by a plurality of wall blocks attached by curable material, comprising: a frame member including a container flange configured to abut against at least some of the plurality of wall blocks; a plurality of posts disposed at the container flange and configured to be received in the curable material disposed between the plurality of wall blocks; a retainer member; and a plurality of fasteners; wherein the retainer member is configured to be attached to the frame member based on the plurality of fasteners being received through a plurality of apertures of the container flange and a plurality of apertures of the retainer member and by being received in the plurality of posts.

Embodiment 2: The apparatus of Embodiment 1, wherein the plurality of posts are disposed at the plurality of apertures of the container flange, and the plurality of apertures of the retainer member are configured to be aligned with the plurality of apertures of the container flange when the retainer member is attached to the container flange.

Embodiment 3: The apparatus of Embodiment 1, wherein the frame member further includes a window flange disposed at an opposite side of the frame member as the container flange, the window flange configured to receive the window.

Embodiment 4: The apparatus of Embodiment 1, wherein the frame member further includes an interior wall disposed between the container flange and the window flange, the container flange extending from the interior wall in a first direction, and the window flange extending from the interior wall in a second direction that is opposite to the first direction.

Embodiment 5: The apparatus of Embodiment 1, wherein each of the plurality of posts includes a shaft attached to the container flange and a head disposed at an opposite end of the shaft from the container flange, the head having a larger width than a width of the shaft.

Embodiment 6: The apparatus of Embodiment 1, wherein each of the plurality of posts includes a shaft having a hollow, threaded portion configured to threadably receive threading of the plurality of fasteners.

Embodiment 7: The apparatus of Embodiment 1, wherein the container flange has a U-shape and the retainer member has the same U-shape.

Embodiment 8: The apparatus of Embodiment 1, wherein the fluid container is a fish pond formed by the plurality of wall blocks that are concrete masonry units attached by the curable material that is mortar, the plurality of posts being configured to be received in the mortar.

Embodiment 9: A method for providing a fluid container, comprising: providing a plurality of wall blocks forming the fluid container; attaching the plurality of wall blocks using curable material; providing a frame member including a container flange having a plurality of posts attached at the container flange; disposing the container flange against at least some of the plurality of wall blocks; receiving the plurality of posts in the curable material disposed between the plurality of wall blocks; and fastening a retainer member to the container flange using a plurality of fasteners, the retainer member being attached to the frame member based on the plurality of fasteners being received through a plurality of apertures of the container flange and a plurality of apertures of the retainer member and by being received in the plurality of posts.

Embodiment 10: The method of Embodiment 9, wherein fastening the retainer member to the container flange includes: temporarily fastening the retainer member to the container flange before the curable material receiving the plurality of posts cures; and detaching the retainer member from the container flange after the curable material cures.

Embodiment 11: The method of Embodiment 10, wherein the container flange is U-shaped, and temporarily fastening the retainer member to the container flange includes temporarily attaching the retainer member as a strut between end portions of legs of the U-shaped container flange.

Embodiment 12: The method of Embodiment 9, wherein fastening the retainer member to the container flange includes: temporarily fastening the retainer member to the container flange in a first orientation before the curable material receiving the plurality of posts cures; and permanently fastening the retainer member to the container flange in a second orientation after the curable material receiving the plurality of posts cures, the first orientation being different from the second orientation.

Embodiment 13: The method of Embodiment 12, wherein the first orientation is upside down relative to the second orientation.

Embodiment 14: The method of Embodiment 9, wherein the retainer member is U-shaped, and fastening the retainer member to the container flange includes: fastening the retainer member to the container flange in a first orientation before the curable material receiving the plurality of posts cures; and fastening the retainer member to the container flange in a second orientation after the curable material receiving the plurality of posts cures; wherein in the first orientation, legs of the U-shaped retainer member are pointed downward; and wherein in the second orientation, legs of the U-shaped retainer member are pointed upward.

Embodiment 15: The method of Embodiment 9, wherein fastening the retainer member to the container flange includes: fastening the retainer member to the container flange in a first orientation before the curable material receiving the plurality of posts cures; detaching the retainer member from the container flange after the curable material cures; and fastening the retainer member to the container flange in a second orientation after the curable material receiving the plurality of posts cures, the first orientation being reversed relative to the second orientation.

Embodiment 16: The method of Embodiment 9, wherein fastening the retainer member to the container flange includes pressing a portion of a fluid container liner and a sealant between the retainer member and the container flange.

Embodiment 17: An apparatus for a fluid container formed by a plurality of wall blocks attached by curable material, comprising: a frame member including an interior wall disposed between a window flange and a container flange, the container flange configured to abut against at least some of the plurality of wall blocks; a plurality of posts disposed at the container flange and configured to be received in the curable material disposed between the plurality of wall blocks; a retainer member; a plurality of fasteners; and a window configured to be received by the window flange; wherein the retainer member is configured to be attached to the frame member based on the plurality of fasteners being received through a plurality of apertures of the container flange and a plurality of apertures of the retainer member and by being received in the plurality of posts.

Embodiment 18: The apparatus of Embodiment 17, wherein each of the plurality of posts includes a shaft welded to the container flange and a head disposed at an opposite end of the shaft from the container flange, the head may be a larger width than a width of the shaft; wherein the shaft has a hollow, threaded portion configured to threadably receive threading of the plurality of fasteners.

Embodiment 19: The apparatus of Embodiment 17, further comprising a plurality of flexible offset members, wherein the plurality of flexible offset members are configured to be disposed between the window and the window flange when the window is attached to the window flange.

Embodiment 20: The apparatus of Embodiment 17, wherein the frame member is formed from stainless steel and the retainer member is formed from either stainless steel or plastic.

In at least some exemplary embodiments, the exemplary disclosed system, apparatus, and method may provide an efficient and effective system for preventing leakage through a window of a fluid container such as, for example, a window of a pond. The exemplary disclosed system, apparatus, and method may also provide an efficient and effective system for resisting lateral loads against a window of a fluid container. For example, the exemplary disclosed system, apparatus, and method may resist forces (e.g., lateral forces) such as a user leaning on the window, hydrostatic pressure forces from retained fluid, imbalanced forces due to low or no water in the pond, and/or hydrodynamic forces.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus for supporting a window in a fluid container formed by a plurality of wall blocks attached by curable material, comprising:
   a frame member including a container flange configured to abut against at least some of the plurality of wall blocks;
   a plurality of posts disposed at the container flange and configured to be received in the curable material disposed between the plurality of wall blocks;
   a retainer member; and
   a plurality of fasteners;
   wherein the retainer member is configured to be attached to the frame member based on the plurality of fasteners being received through a plurality of apertures of the container flange and a plurality of apertures of the retainer member and by being received in the plurality of posts.

2. The apparatus of claim 1, wherein the plurality of posts are disposed at the plurality of apertures of the container flange, and the plurality of apertures of the retainer member are configured to be aligned with the plurality of apertures of the container flange when the retainer member is attached to the container flange.

3. The apparatus of claim 1, wherein the frame member further includes a window flange disposed at an opposite side of the frame member as the container flange, the window flange configured to receive the window.

4. The apparatus of claim 1, wherein the frame member further includes an interior wall disposed between the container flange and the window flange, the container flange extending from the interior wall in a first direction, and the window flange extending from the interior wall in a second direction that is opposite to the first direction.

5. The apparatus of claim 1, wherein each of the plurality of posts includes a shaft attached to the container flange and a head disposed at an opposite end of the shaft from the container flange, the head having a larger width than a width of the shaft.

6. The apparatus of claim 1, wherein each of the plurality of posts includes a shaft having a hollow, threaded portion configured to threadably receive threading of the plurality of fasteners.

7. The apparatus of claim 1, wherein the container flange has a U-shape and the retainer member has the same U-shape.

8. The apparatus of claim 1, wherein the fluid container is a fish pond formed by the plurality of wall blocks that are concrete masonry units attached by the curable material that is mortar, the plurality of posts being configured to be received in the mortar.

9. A method for providing a fluid container, comprising:
   providing a plurality of wall blocks forming the fluid container;
   attaching the plurality of wall blocks using curable material;
   providing a frame member including a container flange having a plurality of posts attached at the container flange;
   disposing the container flange against at least some of the plurality of wall blocks;
   receiving the plurality of posts in the curable material disposed between the plurality of wall blocks; and
   fastening a retainer member to the container flange using a plurality of fasteners, the retainer member being attached to the frame member based on the plurality of fasteners being received through a plurality of apertures of the container flange and a plurality of apertures of the retainer member and by being received in the plurality of posts.

10. The method of claim 9, wherein the retainer member is U-shaped, and fastening the retainer member to the container flange includes:
   fastening the retainer member to the container flange in a first orientation before the curable material receiving the plurality of posts cures; and
   fastening the retainer member to the container flange in a second orientation after the curable material receiving the plurality of posts cures;
   wherein in the first orientation, legs of the U-shaped retainer member are pointed downward; and wherein in the second orientation, legs of the U-shaped retainer member are pointed upward.

11. The method of claim 9, wherein fastening the retainer member to the container flange includes:
   fastening the retainer member to the container flange in a first orientation before the curable material receiving the plurality of posts cures;
   detaching the retainer member from the container flange after the curable material cures; and
   fastening the retainer member to the container flange in a second orientation after the curable material receiving the plurality of posts cures, the first orientation being reversed relative to the second orientation.

12. The method of claim 9, wherein fastening the retainer member to the container flange includes pressing a portion of a fluid container liner and a sealant between the retainer member and the container flange.

13. The method of claim 9, wherein fastening the retainer member to the container flange includes:
   temporarily fastening the retainer member to the container flange before the curable material receiving the plurality of posts cures; and
   detaching the retainer member from the container flange after the curable material cures.

14. The method of claim 13, wherein the container flange is U-shaped, and temporarily fastening the retainer member to the container flange includes temporarily attaching the retainer member as a strut between end portions of legs of the U-shaped container flange.

15. The method of claim 9, wherein fastening the retainer member to the container flange includes:
   temporarily fastening the retainer member to the container flange in a first orientation before the curable material receiving the plurality of posts cures; and
   permanently fastening the retainer member to the container flange in a second orientation after the curable material receiving the plurality of posts cures, the first orientation being different from the second orientation.

16. The method of claim 15, wherein the first orientation is upside down relative to the second orientation.

17. An apparatus for a fluid container formed by a plurality of wall blocks attached by curable material, comprising:
   a frame member including an interior wall disposed between a window flange and a container flange, the container flange configured to abut against at least some of the plurality of wall blocks;
   a plurality of posts disposed at the container flange and configured to be received in the curable material disposed between the plurality of wall blocks;
   a retainer member;
   a plurality of fasteners; and
   a window configured to be received by the window flange;
   wherein the retainer member is configured to be attached to the frame member based on the plurality of fasteners being received through a plurality of apertures of the container flange and a plurality of apertures of the retainer member and by being received in the plurality of posts.

18. The apparatus of claim 17, wherein each of the plurality of posts includes a shaft welded to the container flange and a head disposed at an opposite end of the shaft from the container flange, the head having a larger width than a width of the shaft;

wherein the shaft has a hollow, threaded portion config-
ured to threadably receive threading of the plurality of
fasteners.

19. The apparatus of claim 17, further comprising a
plurality of flexible offset members, wherein the plurality of 5
flexible offset members are configured to be disposed
between the window and the window flange when the
window is attached to the window flange.

20. The apparatus of claim 17, wherein the frame member
is formed from stainless steel and the retainer member is 10
formed from either stainless steel or plastic.

\* \* \* \* \*